(12) United States Patent
Larson et al.

(10) Patent No.: US 7,506,545 B1
(45) Date of Patent: Mar. 24, 2009

(54) BALANCING DEVICE

(75) Inventors: Ted W. Larson, Los Altos Hills, CA (US); Robert Allen, Ben Lomond, CA (US)

(73) Assignee: OLogic, Inc., Los Altos Hills, CA (US)

( * ) Notice: Subject to any disclaimer, the term of this patent is extended or adjusted under 35 U.S.C. 154(b) by 342 days.

(21) Appl. No.: 11/429,644

(22) Filed: May 5, 2006

Related U.S. Application Data

(60) Provisional application No. 60/678,456, filed on May 5, 2005.

(51) Int. Cl.
*G01M 1/16* (2006.01)
(52) U.S. Cl. ....................................................... 73/462
(58) Field of Classification Search ............... 73/460, 73/462, 464, 468; 702/56; 700/279–280, 700/56–57, 164
See application file for complete search history.

(56) References Cited

U.S. PATENT DOCUMENTS

| | | | | | |
|---|---|---|---|---|---|
| 3,752,325 | A | * | 8/1973 | Sato et al. | 212/279 |
| 5,267,140 | A | * | 11/1993 | Ibe | 700/47 |
| 5,969,247 | A | * | 10/1999 | Carter et al. | 73/462 |
| 6,618,646 | B1 | * | 9/2003 | Dyer | 700/279 |

* cited by examiner

*Primary Examiner*—Helen C. Kwok
(74) *Attorney, Agent, or Firm*—Van Pelt, Yi & James LLP

(57) ABSTRACT

A balancing device includes an active balancing mechanism. The active balancing mechanism maintains the balancing device in an actively balanced state within a range of the active balancing mechanism. An auxiliary balancing mechanism is configured to support the balancing device in an unbalanced state that is outside the range of the active balancing mechanism and aid a transition of the balancing device to the actively balanced state that is within the range of the active balancing mechanism. A processor is configured to actively control the transition from the unbalanced state to the actively balanced state.

29 Claims, 11 Drawing Sheets

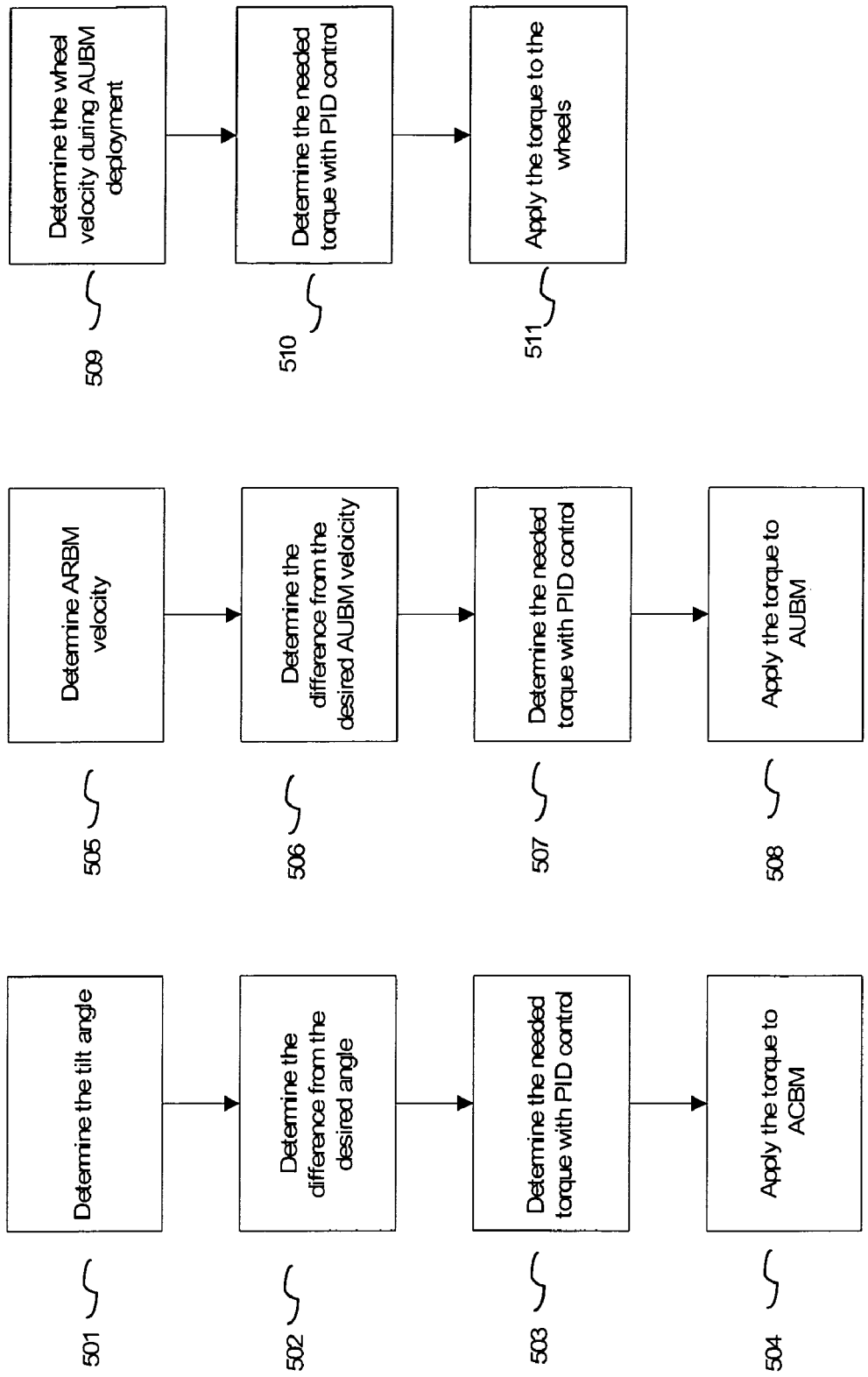

BALANCING DEVICE

CROSS REFERENCE TO OTHER APPLICATIONS

This application claims priority to U.S. Provisional Patent Application No. 60/678,456, entitled BALANCING ROBOT filed May 5, 2005, which is incorporated herein by reference for all purposes.

BACKGROUND OF THE INVENTION

Various balancing robots or devices have been developed. Such devices rely on some type of active balancing mechanism that operates to effectively balance a device within an active balancing range. However, it is possible under some circumstances for the device to be outside the balancing range, for example when the device has somehow fallen over or when it is first activated. It would be useful if techniques could be developed to balance a device that is outside of the balancing range.

BRIEF DESCRIPTION OF THE DRAWINGS

The present invention will be readily understood by the following detailed description in conjunction with the accompanying drawings, and in which:

FIG. 5A is a flowchart illustrating a process used in one embodiment by the control mechanism to determine the torque applied to the active balancing mechanism for aiding the transition.

FIG. 5B is a flowchart illustrating a process used in one embodiment by the control mechanism to determine the torque applied to the auxiliary balancing mechanism for deploying and stowing the auxiliary balancing mechanism at a constant velocity.

FIG. 5C is a flowchart illustrating a process used in one embodiment by the control mechanism to determine the torque applied to the wheels for actively balancing the device and achieving zero wheel velocity when deploying and stowing the auxiliary balancing mechanism.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In various embodiments described herein, a balancing device is either in an actively balanced state or in an unbalanced state. The device includes an active balancing mechanism (ACBM), an auxiliary balancing mechanism (AUBM), and a processor that controls a transition between the actively balanced state and the unbalanced state. The device is in the actively balanced state when it is inside a range of the active balancing mechanism. The auxiliary balancing mechanism is deployed to aid the transition between the actively balanced state and the unbalanced state, and is stowed after the transition is complete. The device includes a processor for controlling the active balancing mechanism and the auxiliary balancing mechanism in such a manner as to achieve a successful and smooth transition between the two states. In one embodiment, the balancing device is a robot, while the active balancing system comprises a pair of lateral wheels driven by a motor and the auxiliary balancing system comprises a lifting arm. In another embodiment, the device is a toy doll, while the active balancing system comprises a pair of weighted arms and the auxiliary balancing system comprises a spring.

Figure 1:
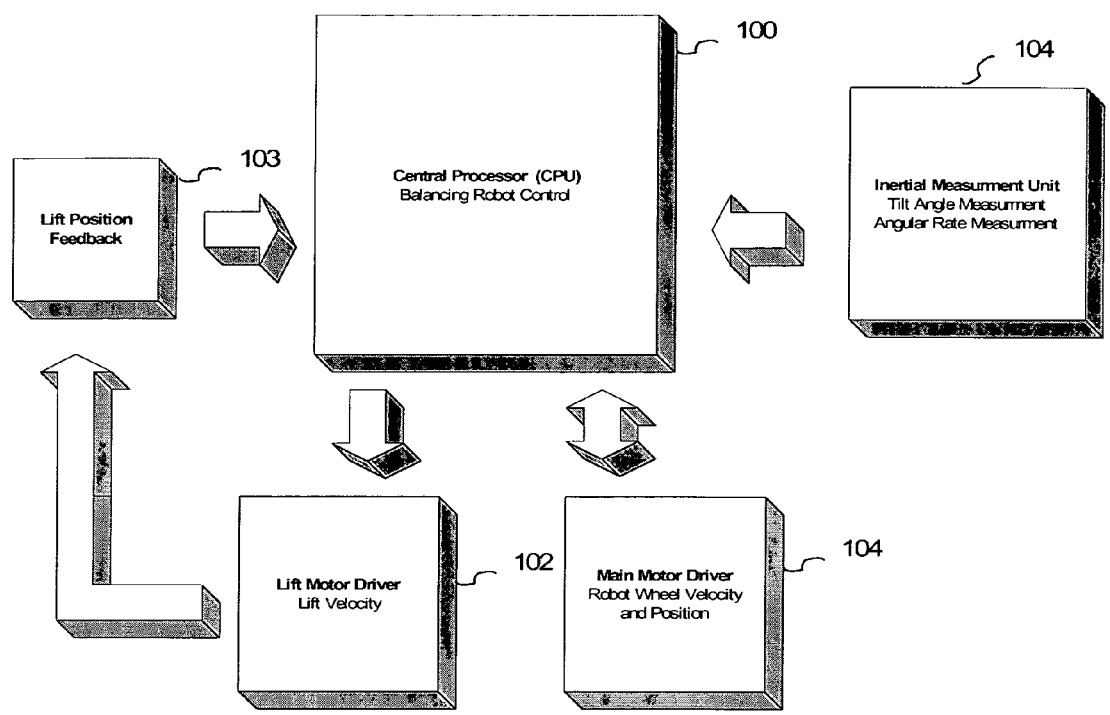
FIG. 1 is a block diagram illustrating how a processor is used in one embodiment to control the active balancing mechanism and the auxiliary balancing mechanism during the transition between the actively balanced state and the unbalanced state.

FIG. 1 is a block diagram illustrating how a processor is used in one embodiment to control the active balancing mechanism and the auxiliary balancing mechanism during the transition between the actively balanced state and the unbalanced state. A processor 100 receives measurements indicating the balancing state of the device from the measuring unit 104. In this embodiment measuring unit 104 measures the tilt angle of the device with a tilt sensor. The angle of the device is used to determine the deviation of its current state from the actively balanced state, because the actively balanced state is the vertical position. In various embodiments, measuring unit 104 also measures the angular rate of the device body. Both the tilt angle and the optional angular rate measurements are used by processor 100 for determining the control signal to send to the active balancing mechanism. In this embodiment, the active balancing mechanism comprises a pair of lateral wheels driven by a motor. Processor 100 determines the torque the motor needs to apply to the wheels during transition, and sends it to a main motor driver 101.

Measuring unit 103 measures the position of the auxiliary balancing mechanism, which is either being deployed or being stowed during a balancing state transition. In this embodiment, the auxiliary balancing mechanism comprises a lifting arm driven by a lift motor. The measured position of the lifting arm is used by processor 100 for determining the torque the lift motor needs to apply to the lifting arm during transition, and sends it to a lift motor driver 102.

Figure 2:
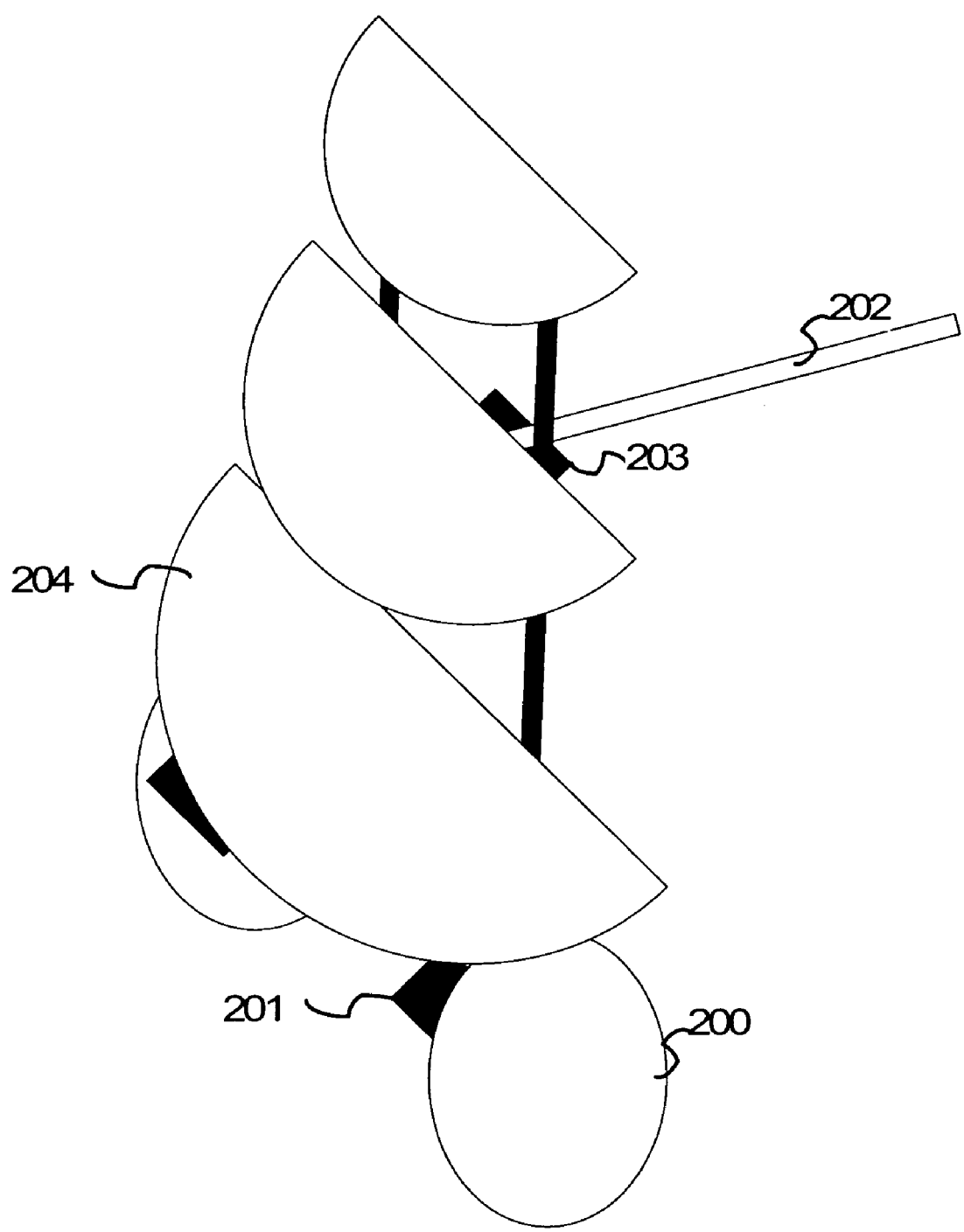
FIG. 2 is a sketch illustrating one embodiment of the balancing device.

FIG. 2 is a diagram illustrating one embodiment of the balancing device. The active balancing mechanism comprises a pair of lateral wheels 200, which is driven by a main motor 201. The auxiliary balancing mechanism comprises a lifting arm 202, which is driven by a lifting motor 203. The device body comprises half circular shaped plates 204 supported by vertical columns. Plates 204 are shaped so as to cause the device to roll into a supine position which could be supported by lifting arm 202 when unbalanced, regardless of its initial unbalanced position, supine, prone, or sideways.

Figure 3A:
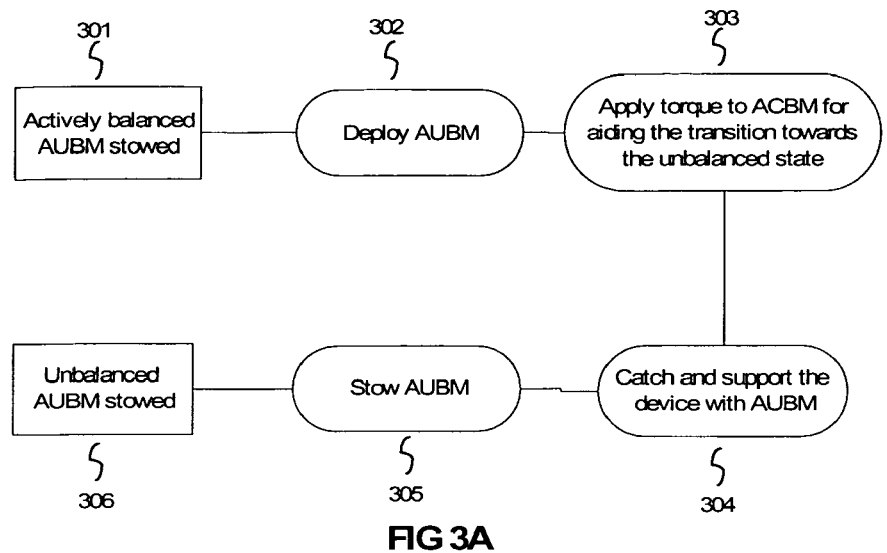
FIG. 3A is a flowchart illustrating a process used in one embodiment for transition from the actively balanced state to the unbalanced state.

FIG. 3A is a flowchart illustrating a process used in one embodiment for transition from the actively balanced state to the unbalanced state. The device starts at the actively balanced state 301, with the auxiliary balancing mechanism (AUBM) stowed. Once it is determined that the device is to move into the unbalanced state, the transition initiates. In a step 302, the AUBM is deployed. In this embodiment, the AUBM is deployed and stowed at a constant velocity. In various embodiments, other schemes such as ejection mechanisms and springy mechanisms are implemented to instantly deploy and stow the AUBM. The active balancing mechanism (ACBM) keeps the device actively balanced during the deployment. Next, in a step 303, when the device senses that the AUBM deployment is completed, it applies a torque to the ACBM for kicking the device towards the unbalanced state. Next, in a step 304, the device is caught and supported by the AUBM. In a step 305, the AUBM is stowed in a constant velocity and the device approaches the unbalanced state. The device reaches the unbalanced state at 306, with the AUBM in stowage, thus having completed the transition.

Figure 3B:
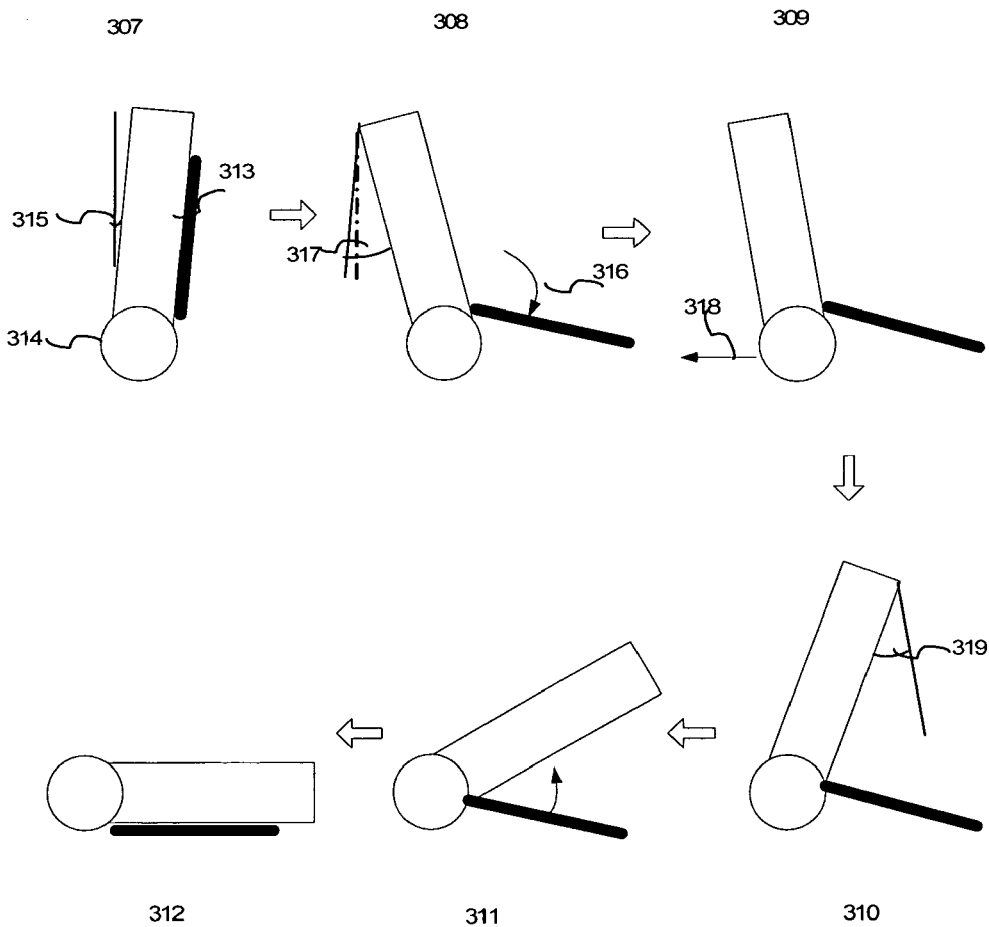
FIG. 3B shows a sequence of the movements by the balancing device in the process described by FIG. 3A.

FIG. 3B shows a sequence of the positions of the balancing device during the process described by FIG. 3A. At position 307 the AUBM comprising a lifting arm 313 is stowed and the ACBM comprising a pair of lateral wheels 314 actively balances the device. The device reaches an equilibrium angle Θ 315 when its center of gravity is right above the line connecting the two contact points between the two wheels and a supporting surface. For a perfectly symmetrical device and a perfectly horizontal supporting surface, Θ 315 should be zero, or the device should be vertical. In this embodiment, Θ 315 is determined when the device requires the least amount of manual support with the ACBM initially off. Θ 315 is in turn programmed into the device so the ACBM will always balance the device around this angle.

During the AUBM deployment at position 308, a torque 316 is applied to the lifting arm 313 by a lift motor to achieve constant deploying velocity. Torque 316 is determined by a closed loop control mechanism with a processor as described in FIG. 1. In this embodiment, the closed-loop control mechanism uses proportional, derivative, and integral (PID) control; and torque 316 is given by the following equation:

$$AUBM \text{ Torque} = (V_p \cdot K_p) + (V_d \cdot K_d) + (\int V_p \cdot K_i)$$

wherein $V_p$ is the difference between the instant AUBM deploying velocity and the desired AUBM deploying velocity; $V_d$ is the derivative of $V_p$; $\int V_p$ is the integral of $V_p$; $K_p$, $K_d$ and $K_i$ are PID constants.

In this embodiment, the control mechanism is implemented in discreet constant time intervals. $V_d$ is determined by the difference between the current $V_p$ and the $V_p$ measured at the previous time step:

$$V_d(t) = V_p(t) - V_p(t-1)$$

During the AUBM deployment, the ACBM keeps the device actively balanced. Due to the change of the device's weight distribution, the equilibrium angle has to be adjusted by an offset ΔΘ 317 to maintain zero wheel velocity. ΔΘ 317 is determined by a closed loop control mechanism with a processor as described in FIG. 1. In this embodiment, the closed-loop control mechanism uses PID control in discreet constant time intervals; and ΔΘ 317 is given by the following equation:

$$\Delta\Theta = (WV_p \cdot WK_p) + (WV_d \cdot WK_d) + (\int WV_p \cdot WK_i)$$

wherein $WV_p$ is the instant wheel velocity; $WV_d$ is the derivative of $WV_p$; $\int WV_p$ is the integral of $WV_p$; $WK_p$, $WK_d$ and $WK_i$ are PID constants.

In this case, there are two control mechanisms working together to keep the device actively balanced with zero wheel velocity. The closed loop described by the equation above determines the equilibrium angle offset ΔΘ 317 and feeds it to the ACBM. The ACBM in turn calculates the new equilibrium angle to balance the device.

At position 309, after the AUBM is fully deployed, a torque 318 is applied by the main motor to the pair of wheels 314 for providing a kick to unbalance the device and make it tip over towards the deployed AUBM. Torque 318 is proportional to an angle 319 between the two device body positions at 309 and 310. In this embodiment, torque 318 is applied for a constant time period. Torque 318 is determined by the following equation:

$$\text{Torque} = \Delta\Theta \cdot T \cdot K_p + T \cdot K_c$$

wherein ΔΘ is the deviation from the actively balanced state, or the angle between the two device body positions in this embodiment, T is a constant time period, $K_p$ and $K_c$ are two constants.

The kick is big enough to tip over the device body, which will then be caught by the deployed AUBM, or lifting arm 313 at position 310. The device then proceeds towards a final resting position 312 through an intermediate position 311 as described in FIG. 3A.

Figure 4A:
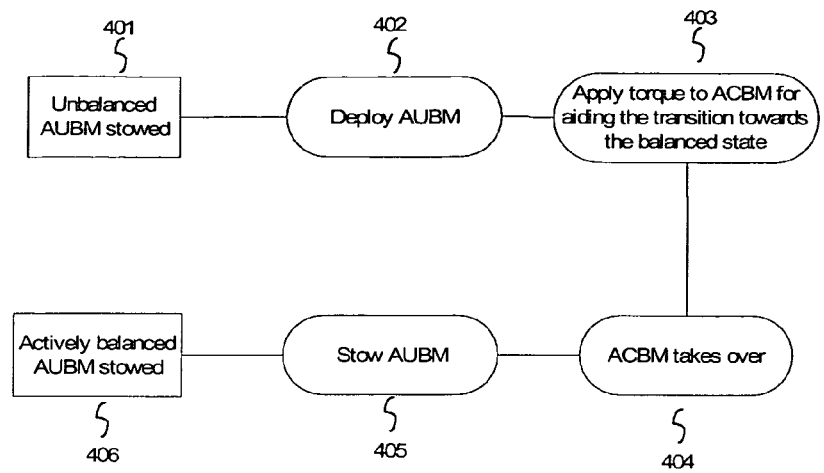
FIG. 4A is a flowchart illustrating a process used in one embodiment for transition from the unbalanced state to the actively balanced state.

FIG. 4A is a flowchart illustrating a process used in one embodiment to transition from the unbalanced state to the actively balanced state. The device starts at the unbalanced state 401, with the AUBM stowed. Once it is determined that the device is to move into the actively balanced state, the transition initiates. In a step 402, the AUBM is being deployed. The AUBM is deployed and stowed at a constant velocity in this embodiment. In various embodiments, other schemes such as ejection mechanisms and springy mechanisms are implemented to instantly deploy and stow the AUBM. Next, in a step 403, when the device senses that AUBM deployment is completed, it applies a torque to ACBM to kick the device towards the actively balanced state. Next, in a step 404, once the device is within the range of ACBM, ACBM takes over and starts to actively balance the device. In a step 405, AUBM is being stowed at a constant velocity while the device is actively balanced by ACBM. The device reaches the balanced state at 406, with the AUBM in stowage, thus having completed the transition.

Figure 4B:
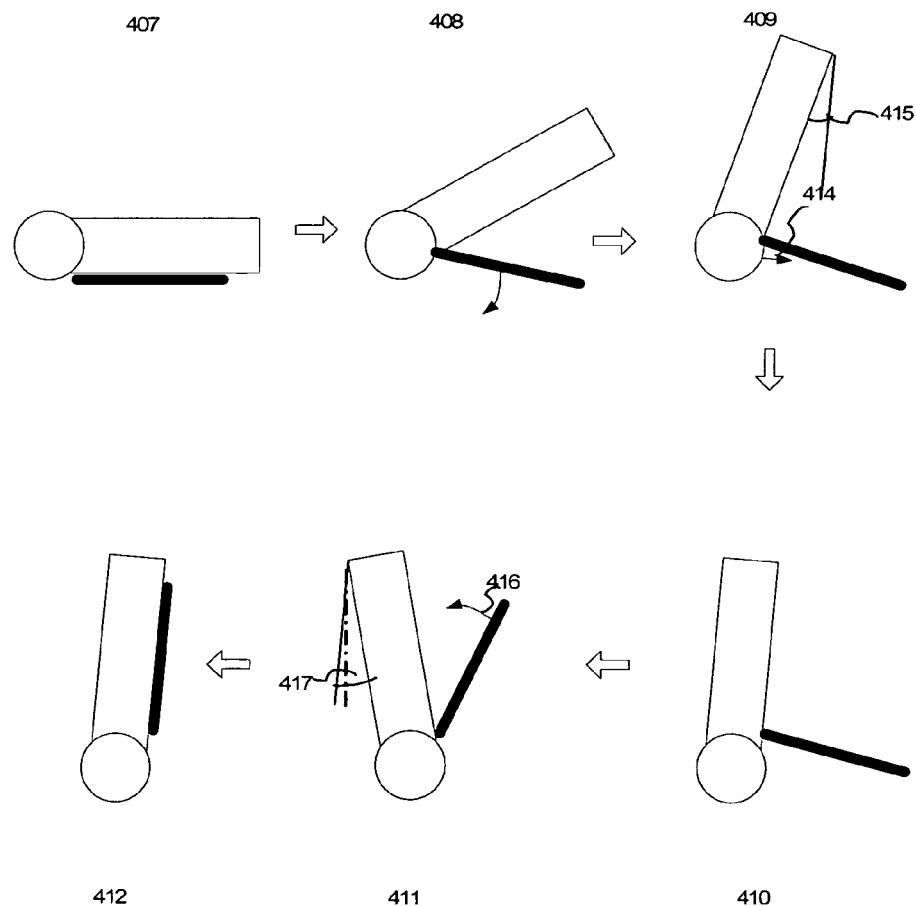
FIG. 4B shows a sequence of the movements by the balancing device in the process described by FIG. 4A.

FIG. 4B shows a sequence of the positions of the balancing device during the process described by FIG. 4A. At position 407 the AUBM is stowed and the ACBM is not active. The AUBM is deployed at position 408. After the AUBM is fully deployed, a torque 414 is applied by the main motor to the ACBM for providing a kick towards the actively balanced state and lifting the device off the AUBM at position 409. Torque 414 is determined by the closed loop control mechanism described in FIG. 1. Torque 414 is determined by the following equation:

$$\text{Torque}=-(\Delta\Theta \cdot T \cdot K_p + T \cdot K_c)$$

wherein $\Delta\Theta$ is the deviation from the actively balanced state, or angle 415, the difference between the initial equilibrium angle and the device body angle at position 409 in this embodiment, T is a constant time period, $K_p$ and $K_c$ are two constants.

During the AUBM stowage at position 411, a torque 416 is applied to the lifting arm by a lift motor to achieve constant stowage velocity. Torque 416 is determined in the same manner as torque 316 is and follows the same equation likewise:

$$\text{Torque}=(V_p \cdot K_p)+(V_d \cdot K_d)+(\int V_p \cdot K_i)$$

During the AUBM stowage at position 411, the ACBM keeps the device actively balanced and the equilibrium angle is adjusted by an offset $\Delta\Theta$ 417 to achieve zero wheel velocity. $\Delta\Theta$ 417 is determined by the following equation:

$$\Delta\Theta=(WV_p \cdot WK_p)+(WV_d \cdot WK_d)+(\int WV_p \cdot WK_i)$$

FIG. 5A is a flowchart illustrating a process used in one embodiment by the control mechanism to determine the torque applied to the ACBM for aiding the transition between the actively balanced state and the unbalanced state. In a step 501, a sensor measures the tilt angle of the device. Next, in a step 502, a processor determines the difference between the measured angle and the desired angle the device is trying to reach. Next, in a step 503, the processor uses PID control to decide the needed torque. In a step 504, the torque is applied to the ACBM.

FIG. 5B is a flowchart illustrating a process used in one embodiment by the control mechanism to determine the torque applied to the AUBM for deploying and stowing the AUBM at a constant velocity. The velocity of the AUBM is measured in a step 505 and is compared to a desired velocity in a step 506. The torque is determined by PID control in a step 507 and is applied to the AUBM in a step 508.

FIG. 5C is a flowchart illustrating a process used in one embodiment by the control mechanism to determine the torque applied to the wheels for actively balancing the device and achieving zero wheel velocity when deploying and stowing the AUBM. Since the desired wheel velocity is zero, the measured wheel velocity from step 509 is used directly by PID control to determine the needed torque in a step 510. In a step 511, the torque is applied to the wheels.

Figure 6A:
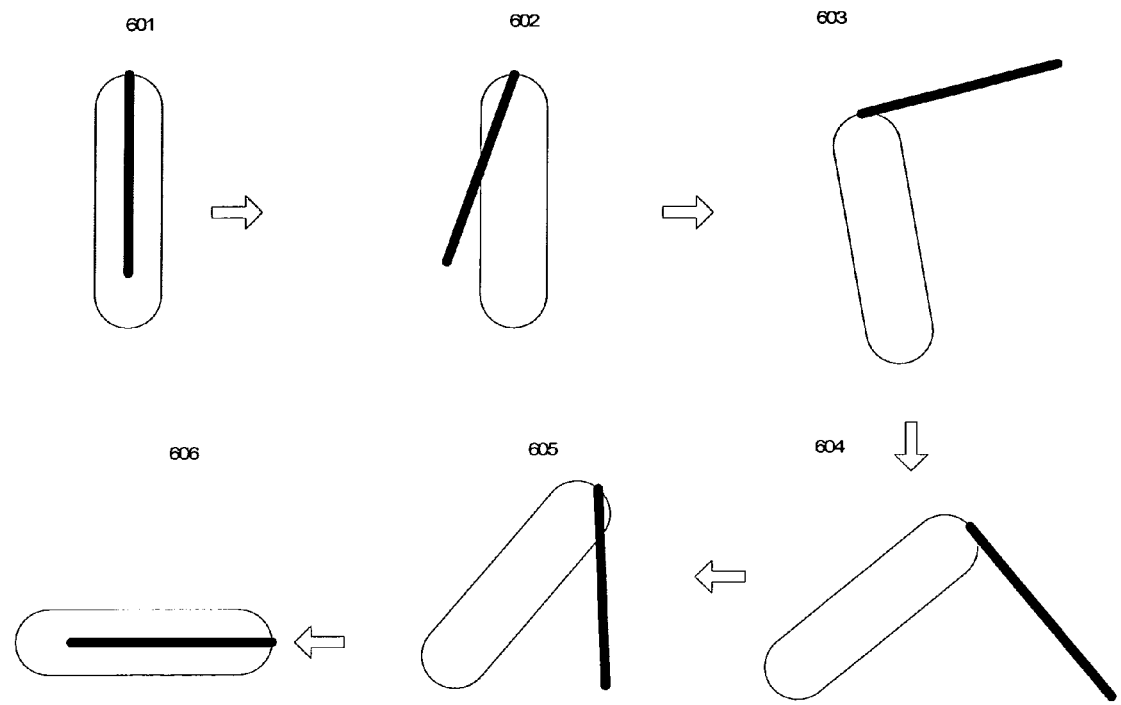
FIGS. 6A and 6B show another embodiment of the balancing device wherein one mechanism serves as both the auxiliary balancing mechanism and the active balancing mechanism.
Figure 6B:
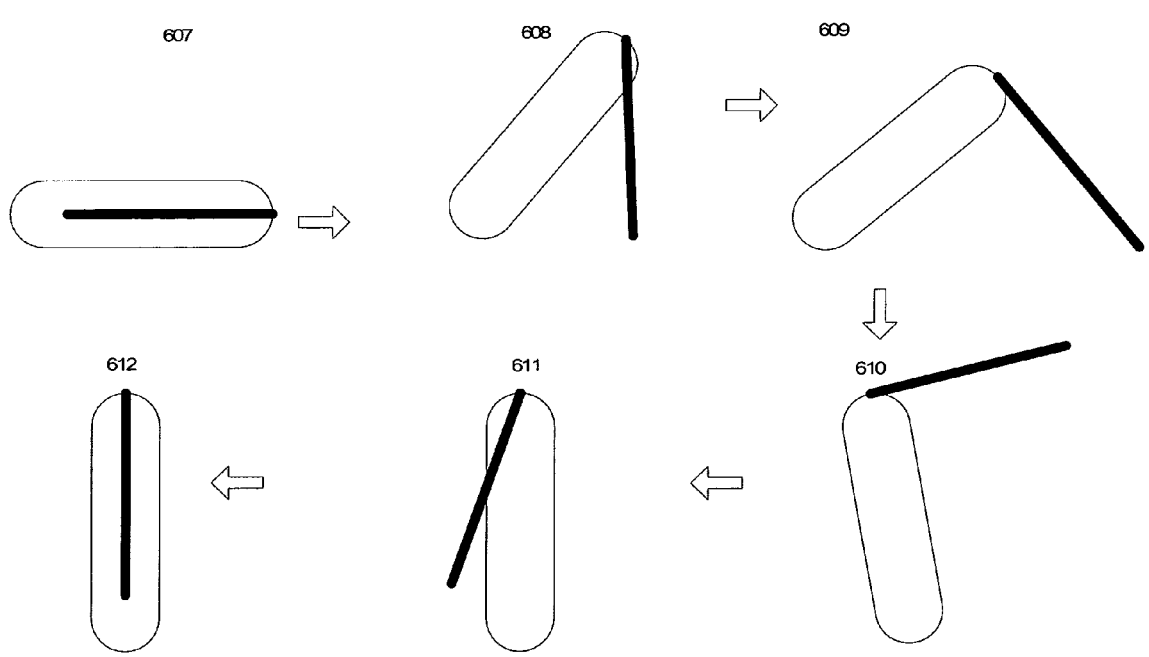

FIGS. 6A and 6B show another embodiment of the balancing device wherein one mechanism serves as both the auxiliary balancing mechanism and the active balancing mechanism.

Figure 7A:
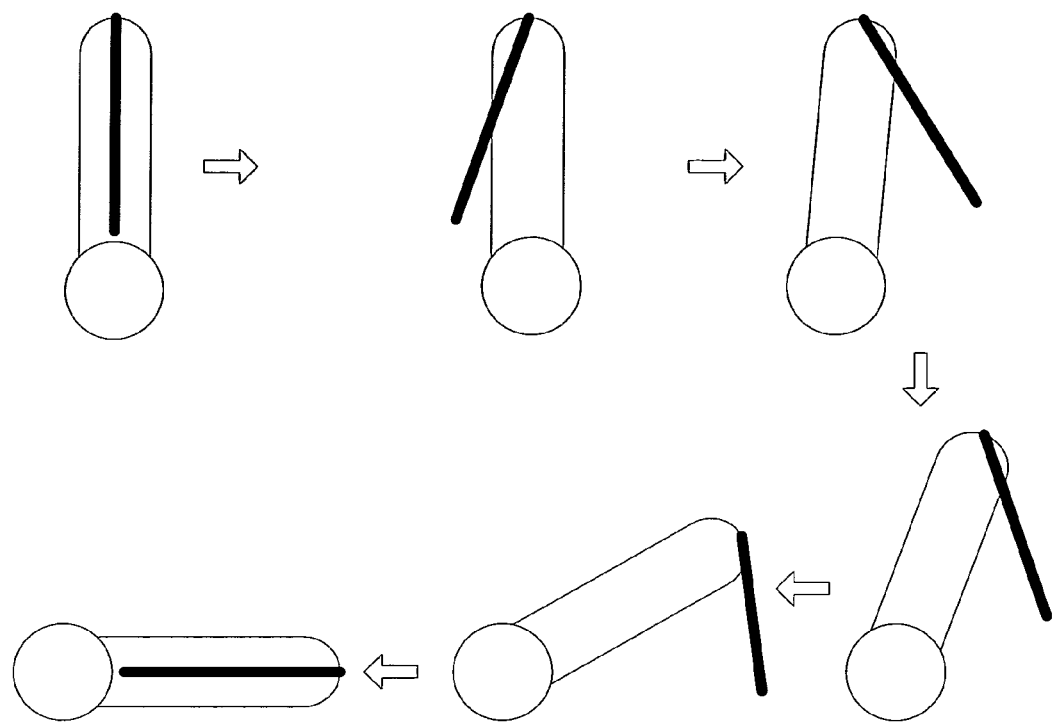
FIGS. 7A and 7B show another embodiment of the balancing device with a different auxiliary balancing mechanism.
Figure 7B:
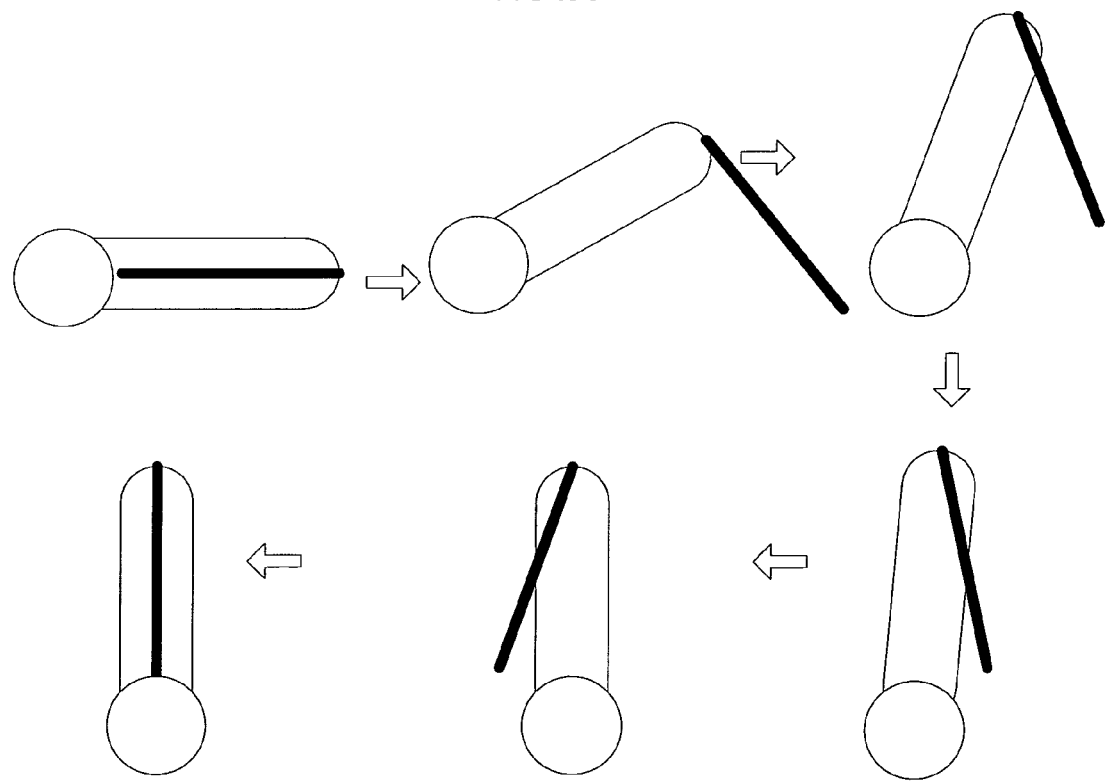

FIGS. 7A and 7B show another embodiment of the balancing device with a different auxiliary balancing mechanism. The steps are described in FIG. 3A and FIG. 4A.

Figure 8A:
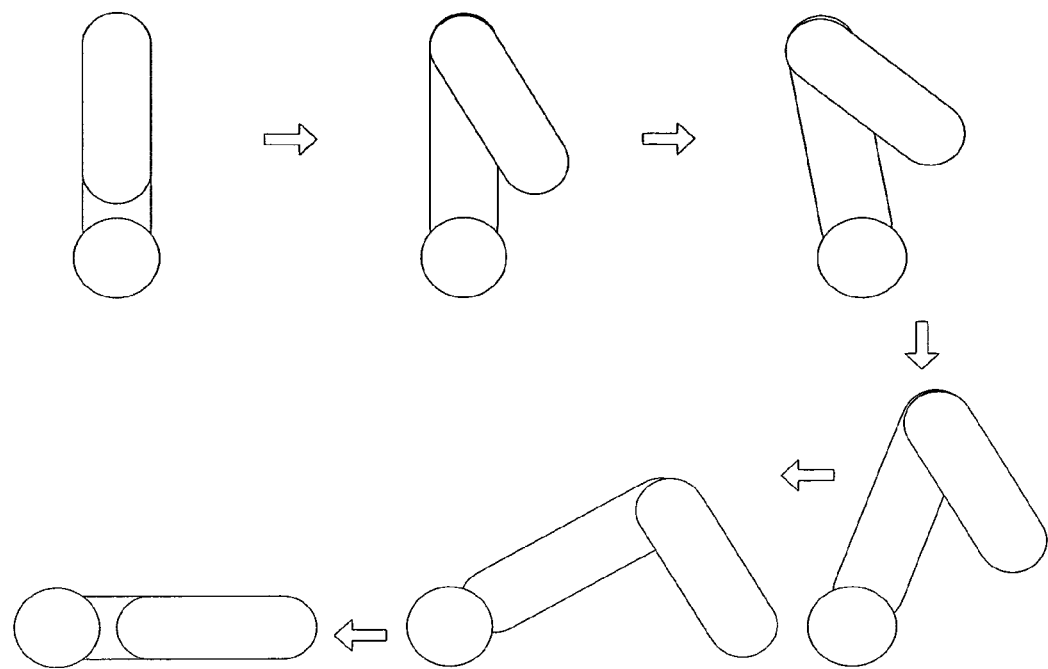
FIGS. 8A and 8B show another embodiment of the balancing device wherein the auxiliary balancing mechanism is part of the device body.
Figure 8B:
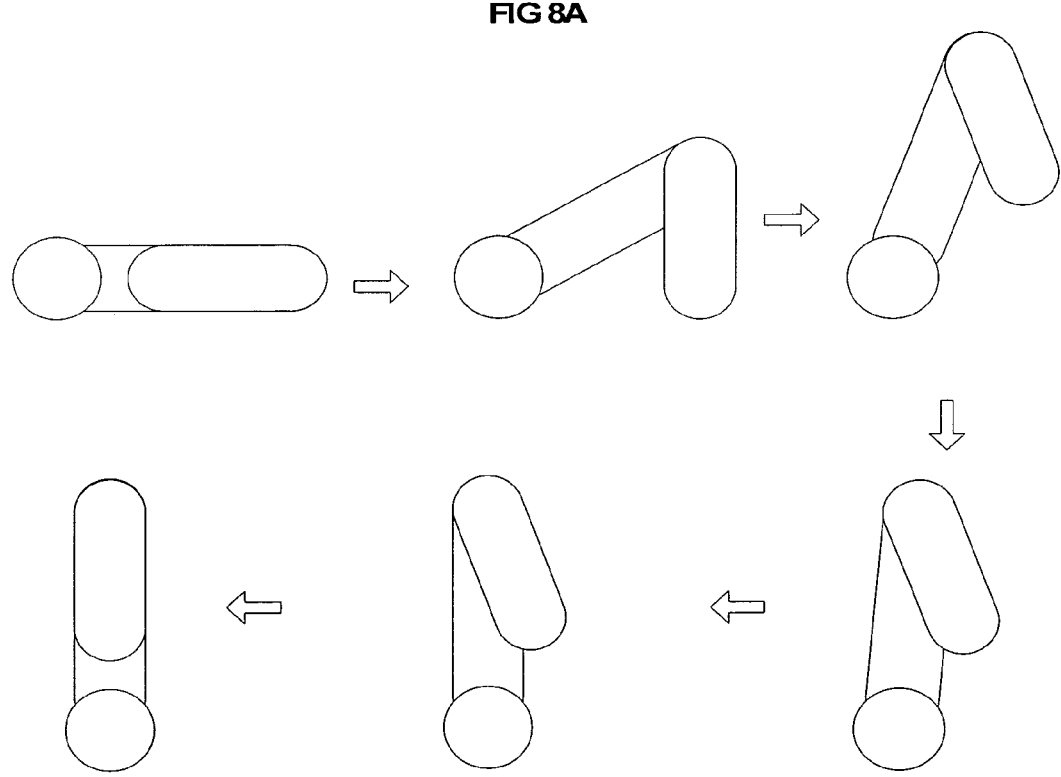

FIGS. 8A and 8B show another embodiment of the balancing device wherein the auxiliary balancing mechanism is part of the device body.

Figure 9A:
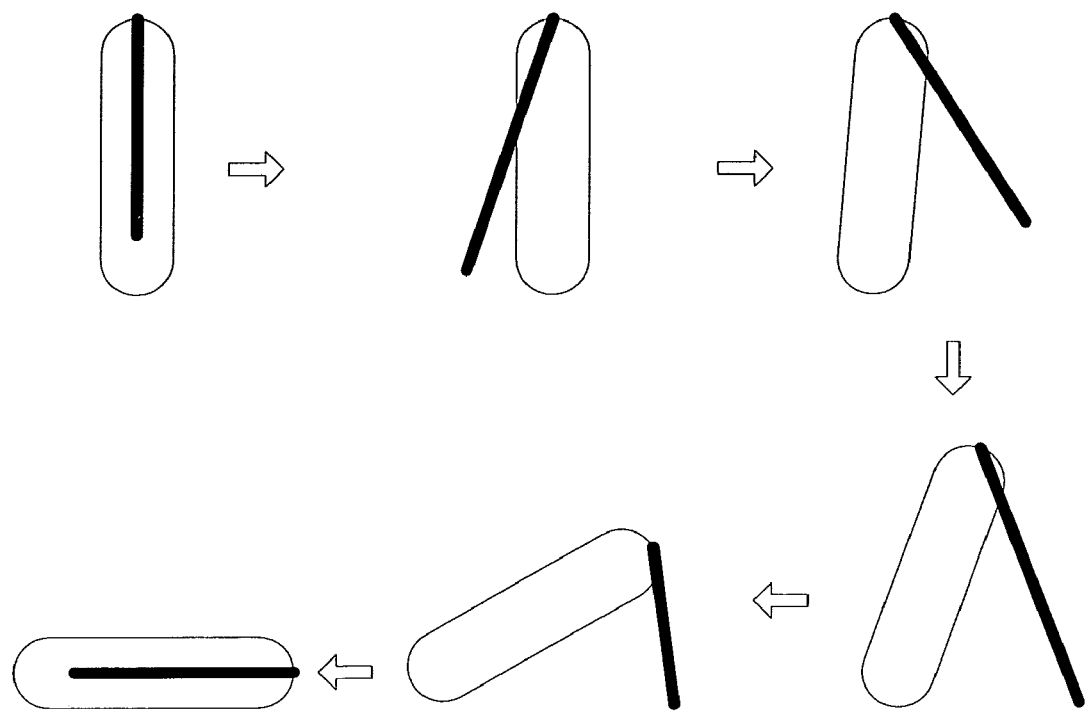
FIGS. 9A and 9B show another embodiment of the balancing device wherein the mechanical arm in FIG. 7 has a variable length.
Figure 9B:
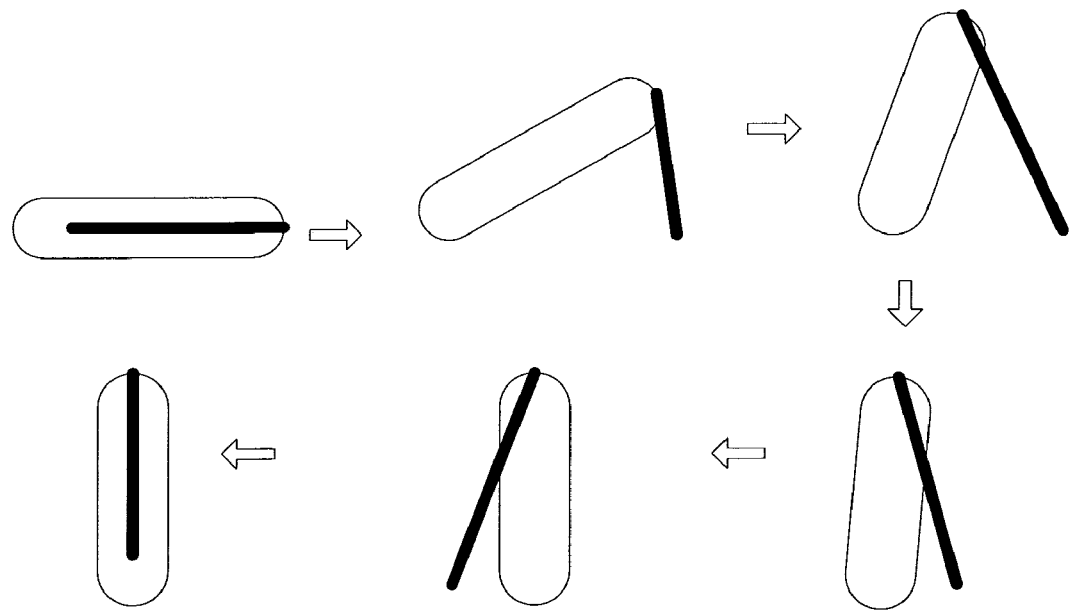

FIGS. 9A and 9B show another embodiment of the balancing device wherein the mechanical arm in FIG. 7 has a variable length.

Figure 10A:
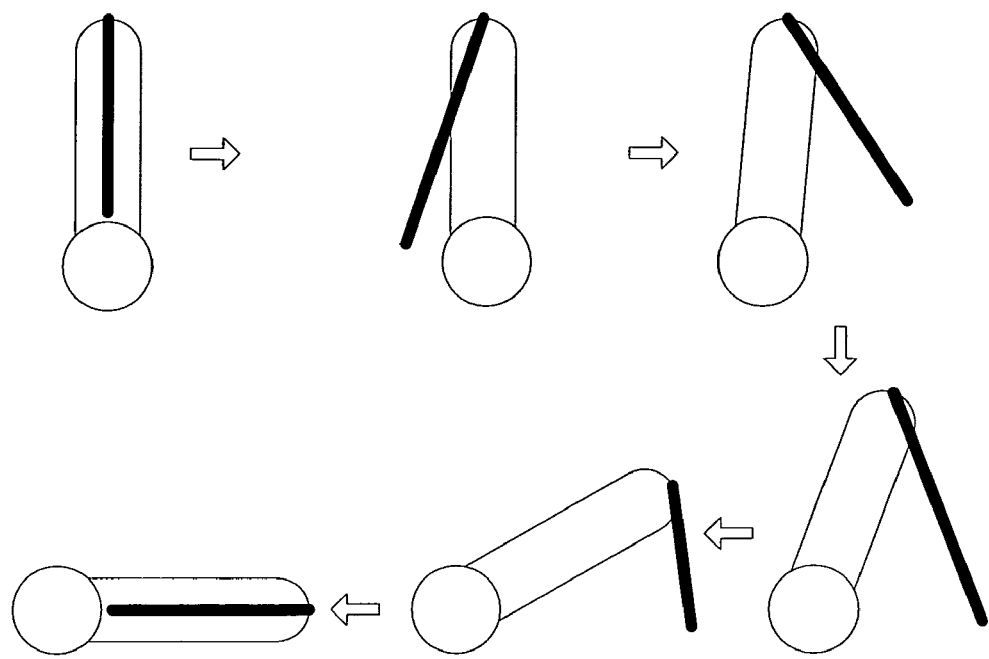
FIGS. 10A and 10B show another embodiment of the balancing device wherein the auxiliary balancing mechanism in FIG. 8 has a variable length.
Figure 10B:
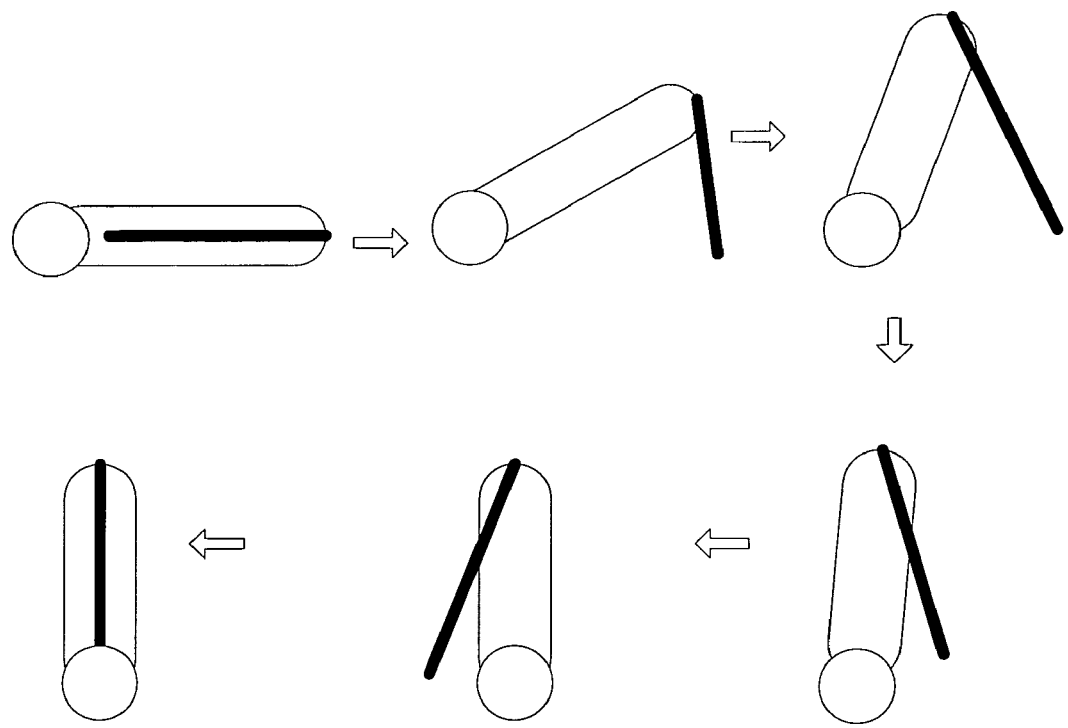

FIGS. 10A and 10B show another embodiment of the balancing device wherein the auxiliary balancing mechanism in FIG. 8 has a variable length.

Figure 11A:
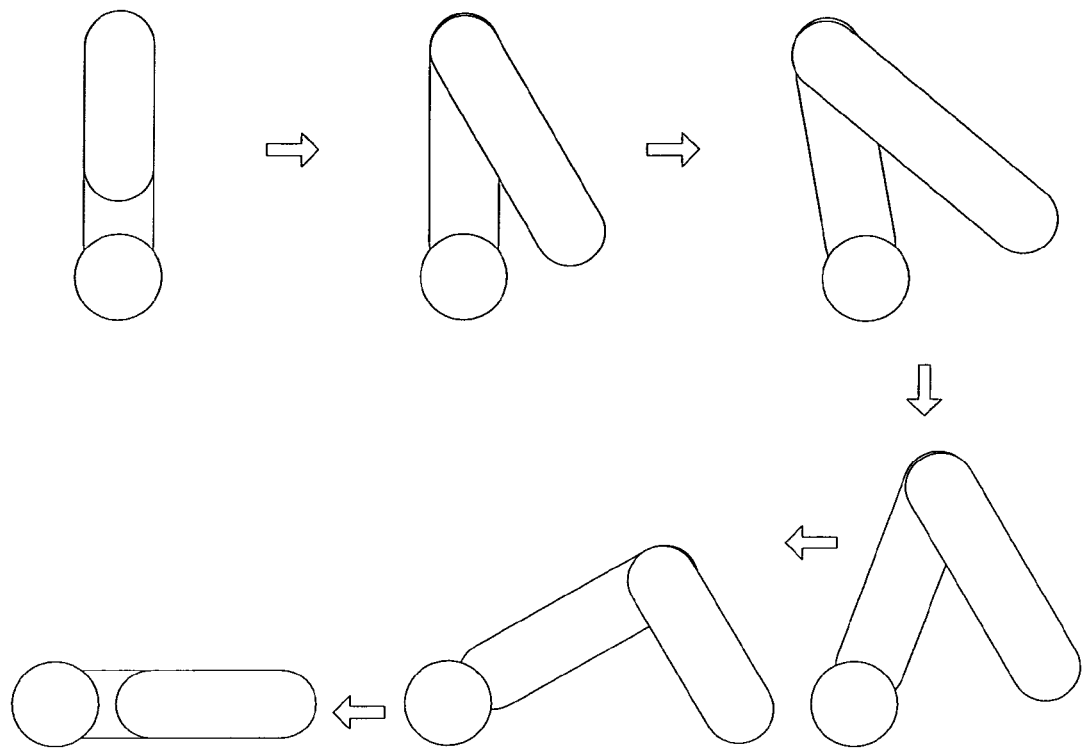
FIGS. 11A and 11B show another embodiment of the balancing device wherein the auxiliary balancing mechanism in FIG. 9 has a variable length.
Figure 11B:
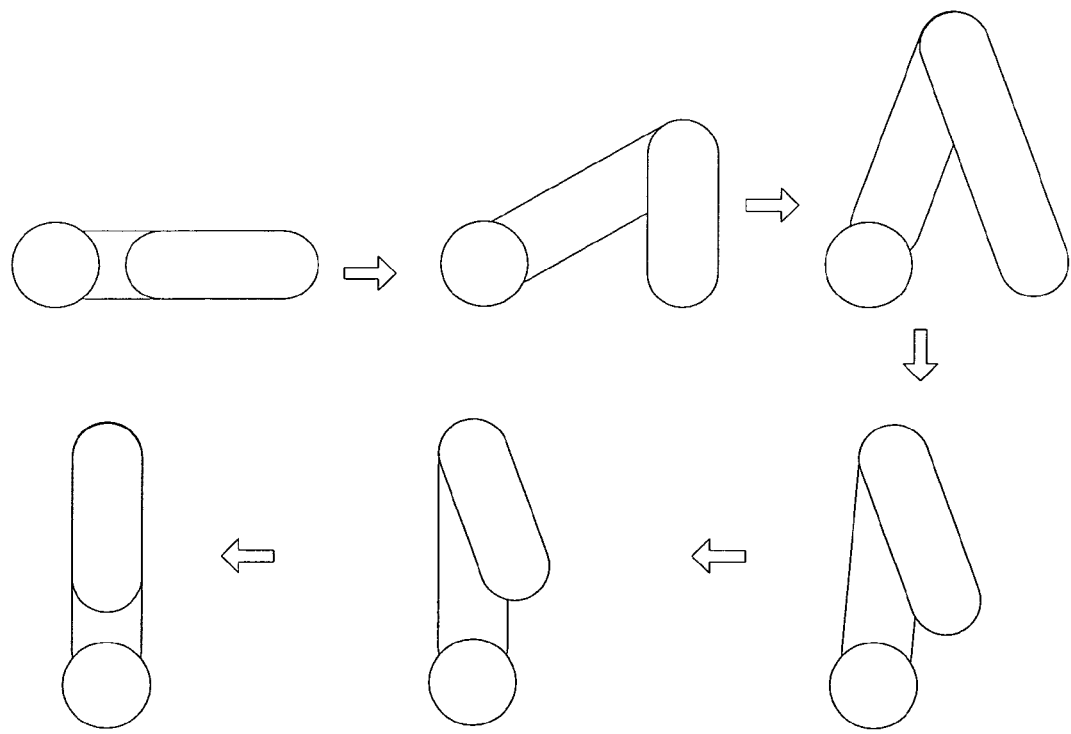

FIGS. 11A and 11B show another embodiment of the balancing device wherein the auxiliary balancing mechanism in FIG. 9 has a variable length.

A system and method for controlling the transition between an actively balanced state and an unbalanced state has been described. Various embodiments include an active balancing mechanism, an auxiliary balancing mechanism, and a processor for closed loop controls. In one embodiment, the active balancing mechanism comprises a pair of lateral wheels and the auxiliary balancing mechanism comprises a lifting arm. In other embodiments, the active balancing mechanism comprises a weighted arm and the auxiliary balancing mechanism may comprise a spring. Various closed loop control mechanisms implemented with a processor for controlling the transition have been described. In one embodiment proportional, derivative and integral control is used for the control mechanisms.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A balancing device including:
    an active balancing mechanism wherein the active balancing mechanism maintains the balancing device in an actively balanced state within a range of the active balancing mechanism;
    an auxiliary balancing mechanism wherein the auxiliary balancing mechanism is configured to support the balancing device in an unbalanced state that is outside the range of the active balancing mechanism and aid a transition of the balancing device to the actively balanced state that is within the range of the active balancing mechanism;
    a processor configured to actively control the transition from the unbalanced state to the actively balanced state.

2. A balancing device as recited in claim 1, wherein the auxiliary balancing mechanism supports the balancing device and aids the transition by providing an impulse that transitions the balancing device from the unbalanced state.

3. A balancing device as recited in claim 1, wherein the processor determines a torque to be applied to the active balancing mechanism for aiding the transition from the unbalanced state to the actively balanced state.

4. A balancing device as recited in claim 1, wherein the processor determines a torque to be applied to the active balancing mechanism for aiding the transition from the unbalanced state to the actively balanced state and the torque is proportional to the deviation from the actively balanced state.

5. A balancing device as recited in claim 1, wherein the processor determines a torque to be applied to the active balancing mechanism for aiding the transition from the unbalanced state to the actively balanced state and the torque is determined by the following equation:

$$\text{Torque}=\Delta\Theta \cdot T \cdot K_p + T \cdot K_c$$

wherein $\Delta\Theta$ is the deviation from the actively balanced state, T is a constant time period, $K_p$ and $K_c$ are two constants.

6. A balancing device as recited in claim 1, wherein the processor determines a torque to be applied to the active balancing mechanism for aiding the transition from the actively balanced state to the unbalanced state.

7. A balancing device as recited in claim 1, wherein the processor determines a torque to be applied to the active balancing mechanism for aiding the transition from the actively balanced state to the unbalanced state and the torque is proportional to the deviation from the actively balanced state.

8. A balancing device as recited in claim 1, wherein the processor determines a torque to be applied to the active balancing mechanism for aiding the transition from the actively balanced state to the unbalanced state and the torque is determined by the following equation:

$$\text{Torque} = -(\Delta\Theta \cdot T \cdot K_p + T \cdot K_c)$$

wherein $\Delta\Theta$ is the deviation from the unbalanced state; $T$ is a constant time period; $K_p$ and $K_c$ are constants.

9. A balancing device as recited in claim 1, wherein the active balancing mechanism includes a pair of lateral wheels driven by a motor in such a manner as to maintain balance.

10. A balancing device as recited in claim 1, wherein the active balancing mechanism includes a maneuverable weighted part that moves in such a manner as to maintain balance.

11. A balancing device as recited in claim 1, further including a closed-loop control mechanism for deploying and stowing the auxiliary balancing mechanism at a constant velocity.

12. A balancing device as recited in claim 1, further including a proportional, derivative, and integral control mechanism for deploying and stowing the auxiliary balancing mechanism at a constant velocity.

13. A balancing device as recited in claim 1, further including a control mechanism that applies a torque to the auxiliary balancing mechanism for deploying and stowing the auxiliary balancing mechanism at a constant velocity and the torque is determined by the following equation:

$$\text{Torque} = (V_p \cdot K_p) + (V_d \cdot K_d) + (\int V_p \cdot K_i)$$

wherein $V_p$ is the difference between the instant deploying or stowing velocity and the desired deploying or stowing velocity; $V_d$ is the derivative of $V_p$; $\int V_p$ is the integral of $V_p$; $K_p$, $K_d$ and $K_i$ are proportional, derivative, and integral constants.

14. A balancing device as recited in claim 13, wherein the torque is determined and applied in constant time intervals.

15. A balancing device as recited in claim 1, further including a control mechanism for keeping the device in balance during deployment or stowage of the auxiliary balancing mechanism.

16. A balancing device as recited in claim 1, wherein the active balancing mechanism includes a pair of lateral wheels driven by a motor which keeps the device actively balanced and keeps the wheels from moving during deployment or stowage of the auxiliary balancing mechanism.

17. A balancing device as recited in claim 1, wherein the active balancing mechanism includes a pair of lateral wheels driven by a motor which keeps the device actively balanced and keeps the wheels from moving during deployment or stowage of the auxiliary balancing mechanism by using proportional, derivative, and integral control.

18. A balancing device as recited in claim 1, wherein a control loop determines an equilibrium angle offset caused by a change in the device's weight distribution, and feeds the offset to the active balancing mechanism for balancing the device to a new equilibrium angle.

19. A balancing device as recited in claim 1, wherein the active balancing mechanism includes a pair of lateral wheels driven by a motor which keeps the device actively balanced and keeps the wheels from moving during deployment or stowage of the auxiliary balancing mechanism by adjusting an equilibrium angle offset determined by the following equation:

$$\Delta\Theta = (WV_p \cdot WK_p) + (WV_d \cdot WK_d) + (\int WV_p \cdot WK_i)$$

wherein $WV_p$ is the instant wheel velocity; $WV_d$ is the derivative of $WV_p$; $\int WV_p$ is the integral of $WV_p$; $WK_p$, $WK_d$ and $WK_i$ are proportional, derivative, and integral constants.

20. A balancing device as recited in claim 19, wherein the torque is determined and applied in constant time intervals.

21. A balancing device as recited in claim 1, wherein the auxiliary balancing mechanism includes a lifting arm.

22. A balancing device as recited in claim 1, wherein a body shape of the device helps roll the device to a position ready to be supported by the auxiliary balancing mechanism in the unbalanced state regardless of its initial position in the unbalanced state.

23. A method of balancing a device including:
transitioning the balancing device from an unbalanced state to an actively balanced state using an auxiliary balancing mechanism wherein the auxiliary balancing mechanism is configured to support the balancing device in an unbalanced state that is outside a range of an active balancing mechanism and aid a transition to the actively balanced state that is within the range of the active balancing mechanism;
controlling the transition from the unbalanced state to the actively balanced state;
actively balancing the device using the active balancing mechanism wherein the active balancing mechanism maintains the balancing device in the actively balanced state within the range of the active balancing mechanism.

24. A method of balancing as recited in claim 23, further including applying a torque to the active balancing mechanism for aiding the transition from the unbalanced state to the actively balanced state.

25. A method of balancing as recited in claim 23, further including applying a torque to the active balancing mechanism for aiding the transition from the unbalanced state to the actively balanced state and determining the torque using proportional, derivative, and integral control.

26. A method of balancing as recited in claim 23, further including applying a torque to the auxiliary balancing mechanism for deploying or stowing the auxiliary balancing mechanism at a constant velocity.

27. A method of balancing as recited in claim 23, further including applying a torque to the auxiliary balancing mechanism for deploying or stowing the auxiliary balancing mechanism at a constant velocity using proportional, derivative, and integral control.

28. A method of balancing as recited in claim 23, further including using wheels to actively balance the device, and maintaining zero wheel velocity during deployment or stowage of the auxiliary balancing mechanism.

29. A method of balancing as recited in claim 23, further including using a closed loop control mechanism to determine an equilibrium angle offset to be used by the active balancing mechanism when weight distribution changes occur.

* * * * *